Oct. 6, 1936.        M. R. HANNA        2,056,785
SAFETY PINION
Filed Dec. 21, 1935
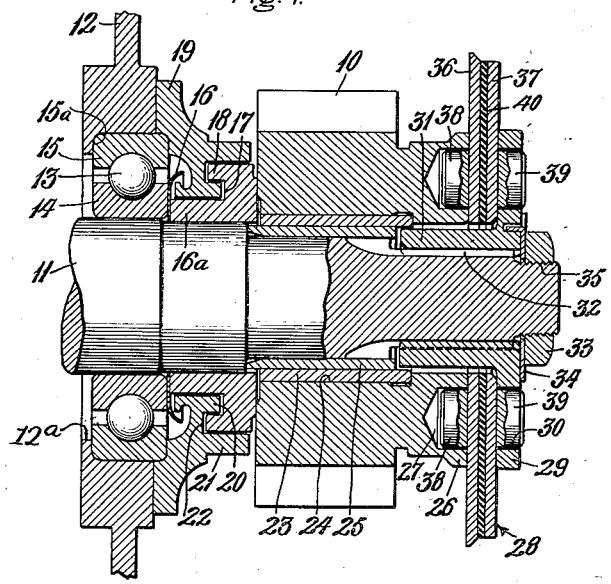
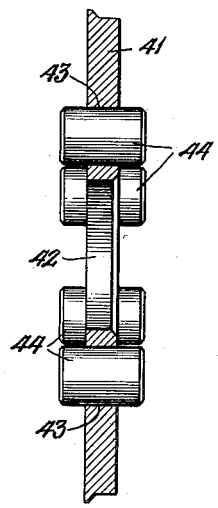
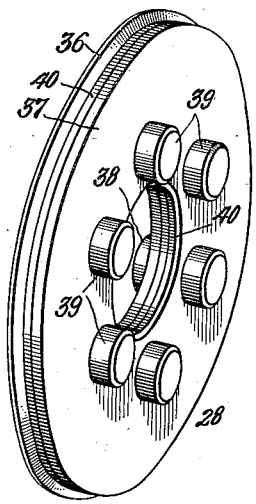
Inventor:
Max R. Hanna,
by Harry E. Dunham
His Attorney.

Patented Oct. 6, 1936

2,056,785

UNITED STATES PATENT OFFICE 2,056,785

SAFETY PINION

Max R. Hanna, Erie, Pa., assignor to General Electric Company, a corporation of New York Application December 21, 1935, Serial No. 55,588

5 Claims. (Cl. 64—28)

My invention relates to gear mounting and coupling constructions.

An object of my invention is to provide a gear having an improved mounting and coupling arrangement, which may be readily manufactured, installed, and removed.

A further object of my invention is to provide an improved coupling having a frangible safety arrangement adapted to release the connection between the driving and driven members under abnormally high load conditions.

Further objects and advantages of my invention will become apparent in the following description referring to the accompanying drawing, and the features of novelty which characterize my invention will be pointed out with particularity in the claims annexed to and forming a part of this specification.

For a better understanding of my invention, reference is made to the accompanying drawing, wherein Fig. 1 is a sectional side elevation of a pinion gear mounted on a generator shaft and provided with a coupling and mounting arrangement embodying my invention; Fig. 2 is a perspective view of an embodiment of my improved coupling shown in Fig. 1 and provided with a resilient frangible element securing together the driving disks of the coupling; and Fig. 3 is a sectional view of a modified driving disk for use in the construction shown in Fig. 1.

Referring to the drawing, I have shown a pinion gear 10, provided with a mounting and coupling arrangement embodying my invention, mounted with a running clearance on a generator armature shaft 11. The shaft 11 is supported in an opening 12a in a generator frame 12 by an antifriction bearing including ball bearings 13 supported between inner and outer annular ball bearing races 14 and 15, respectively. The outer race 15 is press fitted in an annular recess 15a formed in the generator frame 12 and surrounding the opening 12a, the inner race 14 being press fitted on the shaft 11. The bearing is provided with a lubricant seal including an outwardly flared disk 16 retained in position on the shaft 11 between the inner race 14 of the ball bearing and an annular rotatable dust guard 16a, which is press fitted on the shaft 11. This rotatable dust guard is provided with an annular groove 17 and an annular flange 18 arranged to cooperate with a stationary dust guard 19. The stationary guard is provided with a pair of annular flanges 20 and 21 which form an annular groove 22 between them. The stationary flange 20 fits loosely within the groove 17 of the rotatable dust guard, and the annular flange 18 of the rotatable dust guard fits loosely within the groove 22 of the stationary dust guard, thus providing an arrangement for retaining lubricant within the bearing and excluding dust therefrom.

The pinion gear 10 is provided with a self-lubricating bearing bushing 23 tightly secured in an axially extending central opening 24 in the gear, and is loosely mounted on a cooperating bearing 25 secured tightly to the armature shaft 11. The pinion gear 10 is provided with an integral axially extending hub 26 in the end of which are formed a plurality of axially extending circumferentially spaced recesses 27 spaced about the opening 24 in the hub.

The hub 26 is connected by a coupling member or disc 28 to a splined driving member comprising a radially extending flange 29 provided with axially extending openings or recesses 30 arranged to register axially with the recesses in the hub 26 when in assembled relation. This driving member is secured on the shaft against rotation with respect thereto by a splined hub 31 extending axially with the flange 29 and within the central opening 24 of the gear hub 26 and meshes with splines 32 on the motor shaft 11. The driving member is secured to the shaft by a nut 33 and a lock washer 34 on the threaded end 35 of the shaft 11.

It is often desirable to provide a yieldable element in a driving connection or coupling which will yield under certain load conditions to prevent damage to the driving or driven apparatus. The connection of the pinion gear 10 to the shaft 11 is provided through such a safety coupling member 28, illustrated in perspective in Fig. 2. This coupling member includes two radially extending steel plates or disks 36 and 37 provided with laterally extending projections or pins 38 and 39, secured by welding or otherwise to the faces of the disks for engaging the recesses 27 and 30 of the gear hub 26 and the flange 29, respectively. A layer of rubber 40, or some other frangible joint, is vulcanized or otherwise bonded or secured to the adjacent faces of the plates. This layer of rubber flexibly secures the disks together under normal load conditions and provides for their automatic release under abnormally high load conditions, permitting the pinion 10 to rotate freely on the armature shaft 11.

In some installations, the facility of assembly, removal, and replacement of a gear is of greater importance than the provision of a safety coupling. In such cases, a disk shaped plate 41, as illustrated in Fig. 3, may be substituted for the coupling member 28. The disk 41 is provided with a central axially extending opening 42 adapted to fit loosely over the hub 31 and a number of circumferentially spaced openings 43 radially spaced from the central opening 42. Laterally extending projections or pins 44 are secured in the openings 43 and are arranged to engage the recesses 27 and 30 in the pinion hub 26, and the coupling flange 29, respectively. The securing of the disk 41 to the shaft 11 by the splined hub 31, the nut 33, and the lock washer 34, thus provide a simplified and improved coupling arrangement which may be readily installed or removed. Since the pins 38 and 39 of the coupling member 28 shown in Figs. 1 and 2 present peripheral projections of the same size as the pins 44 in the coupling member 41, the two coupling members may be readily interchanged to meet the particular service requirements encountered.

I have illustrated my improved gear and coupling as applied to a pinion gear mounted on a generator shaft, but it is apparent that it may be used with many other types of gear drive. Moreover, modifications of the various forms of my invention, which I have illustrated and described, will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A gear mounting and coupling construction including a gear having an axially extending opening therethrough, a shaft extending through said opening, said gear being provided with axially extending recesses therein, a driving member secured to said shaft and having axially extending recesses formed therein in axial register with said recesses in said gear, and a coupling member including a plurality of plates resiliently secured together and interposed between said gear and said driving member and provided with lateral projections thereon arranged to engage said recesses in said gear and said recesses in said driving member to provide a driving connection between said gear and said shaft.

2. A gear mounting and coupling construction including a gear adapted to be mounted loosely on a shaft, said gear being provided with axially extending recesses therein, a driving member having axially extending recesses formed therein and adapted to be secured to said shaft, a coupling member including a plurality of plates, means including a frangible member for connecting said plates, and projections on said plates extending laterally therefrom into said recesses in said gear and said recesses in said driving member to provide a driving connection between said gear and said driving member.

3. A gear driving and mounting construction including a gear adapted to be mounted loosely on a shaft, said gear being provided with axially extending recesses therein, a driving member adapted to be secured to a shaft and having axially extending recesses formed therein, a coupling connection including a plurality of metal disks arranged in substantially parallel relation and provided with pins extending laterally from the outer surfaces thereof into said recesses in said gear and said recesses in said driving member to provide a driving connection between said gear and said coupling member, and means including a layer of rubber bonded to the adjacent inner surfaces of said disks for yieldably securing the same together.

4. A gear driving and mounting construction including a gear adapted to be mounted loosely on a shaft, said gear being provided with axially extending recesses therein, a driving member adapted to be secured to a shaft and having axially extending recesses formed therein, a coupling member including a plurality of plates, a layer of rubber vulcanized to adjacent surfaces of said plates, and pins secured to the outer plate surfaces and extending laterally therefrom into said recesses in said gear and said recesses in said driving member to provide a driving connection between said gear and said driving member.

5. A gear driving and mounting construction including a gear adapted to be loosely mounted on a shaft, said gear being provided with an axially extending hub having a central opening therein and a plurality of axially extending circumferentially spaced recesses spaced about said central opening, a driving member provided with an axially extending hub arranged within and spaced from said central opening in said first mentioned hub and adapted to be secured to a shaft and having a radially extending flange provided with a plurality of axially extending circumferentially spaced recesses formed therein in axial register with said recesses in said first mentioned hub, a coupling member including a plurality of plates having laterally extending projections arranged to engage said recesses in said first mentioned hub and said recesses in said radially extending flange, and a frangible member securing together said plates.

MAX R. HANNA.